Nov. 4, 1969   E. S. MARVIN   3,476,471
TRIGGER MECHANISM FOR A MOVIE CAMERA OR THE LIKE
Filed Jan. 23, 1967

EDGAR S. MARVIN
INVENTOR.

BY Steve W. Grenban
Robert W. Hampton
ATTORNEYS

United States Patent Office 3,476,471
Patented Nov. 4, 1969

3,476,471
TRIGGER MECHANISM FOR A MOVIE CAMERA OR THE LIKE
Edgar S. Marvin, Rochester, N.Y., assignor to Eastman Kodak Company, Rochester, N.Y., a corporation of New Jersey
Filed Jan. 23, 1967, Ser. No. 611,113
Int. Cl. G03b 1/00
U.S. Cl. 352—178                              3 Claims

ABSTRACT OF THE DISCLOSURE

A trigger mechanism providing three different operating conditions for a movie camera comprises a movable trigger member having a longitudinal slot and a rotatable cam in the slot. The cam is positionable so that: in a first position of the cam, the trigger member is free to move between an operative position and an inoperative position; in a second position of the cam, the trigger member is locked in its inoperative position; and in a third position of the cam, the trigger member is retained in its operative position.

---

This invention relates generally to control mechanisms, and more specifically to an improved trigger mechanism for a movie camera or the like.

Trigger mechanisms for providing different operating conditions for a movie camera or the like are well known in the art. This invention involves providing an improved trigger mechanism for providing three operating conditions for such a device. Such operating conditions are a "lock" condition in which the trigger mechanism is disabled, and the camera can not be operated, a "continuous run" condition in which the camera will operate automatically once operation of the camera is initiated, without the necessity for manually holding any portion of the trigger mechanism, and a "run" condition in which the camera will operate only when a portion of the trigger mechanism is actuated, and will discontinue operation when the portion is released.

This invention and advantages thereof other than those set forth above will be apparent from the following description when read in connection with the acompanying drawings, in which.

Figure 1:
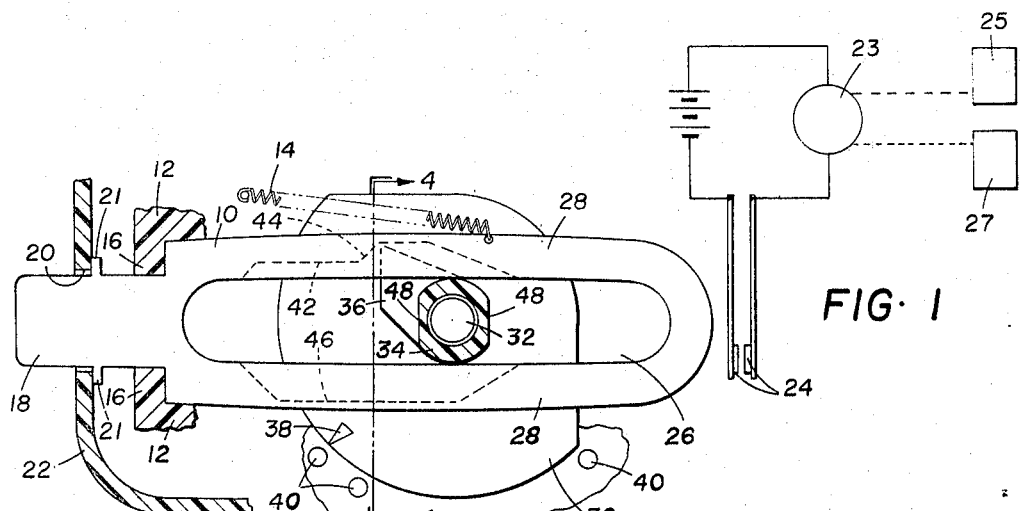
FIG. 1 is a fragmentary side elevation view of the trigger mechanism of this invention in its "lock" condition.

Referring to the drawings, a trigger mechanism is disclosed for a motion picture camera, although it is obvious that such a mechanism may be readily adaptable for other uses such as in motion picture projectors or the like. For this reason, the trigger mechanism is disclosed in detail whereas its possible use in connection with a motion picture camera or the like is merely shown schematically in FIG. 1.

The trigger mechanism of this invention comprises a trigger 10 guided by walls 12 of the camera housing for reciprocative movement. A spring 14 interposed between the housing and trigger 10 urges the trigger into its normal inoperative position against a stop 16 formed by walls 12. The trigger 10 has a button 18 at one end extending through a complementary opening 20 in the camera frame 22. The opposite end of trigger 10 when manually depressed by the operator to its operative position limited by stop lugs 21 cooperates with a pair of flexible switch contacts 24 that are electrically connected to a camera motor 23, shown schematically, which in turn drives a film pulldown mechanism 25 and a take-up spool 27, also shown schematically, as is well known in the art. The trigger 10 has an elongated slot 26 therethrough, and the walls 28 of trigger 10 formed thereby are preferably resilient. Although trigger 10 may be made of any suitable material, a preferred material is polycarbonate resin because of its temperature stability, its high static coefficient of friction, and its ability to return to its original shape after deformation.

A control mechanism for trigger 10 comprises a manually movable knob 30 secured to a shaft 32 extending through slot 26 in trigger 10, and supported by the housing for rotative movement of knob 30 and shaft 32. A cam 34 and an arm 36 are secured to shaft 32 and rotatable therewith within slot 26. The knob 30 has an index mark 38 thereon cooperating with three condition marks 40 on the camera housing designated "lock," "continuous run," and "run."

In the operation of this invention, when knob 30 is moved to its "lock" condition as seen in FIG. 1, the periphery of cam 34 cooperates with the inner surfaces of walls 28 of trigger 10 to partially flex or bow the walls which exert a frictional force on cam 34. Also, in this position, arm 36 extends into an elongated recess 42 in wall 28 and cooperates with a shoulder 44 formed thereby to prevent movement of trigger 10 by the operator from its normal inoperative position as seen in FIG. 1 to its operative position as seen in FIG. 2.

Figure 2:
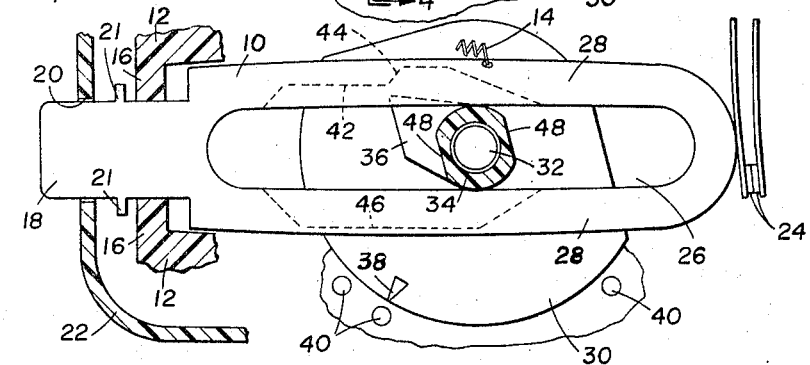
FIG. 2 is a view similar to FIG. 1 showing the trigger mechanism in its "continuous run" condition.

When knob 30 is moved into the "continuous run" position as seen in FIG. 2, arm 36 is withdrawn free of shoulder 44, but cam 34 still cooperates with the inner surfaces of walls 28 to deform the walls which exert a frictional force on cam 34. Accordingly, if the operator should depress trigger 10 to its operative position closing contact switches 24 to actuate the camera motor for taking pictures, trigger 10 will be retained in its operative position even though manually released by the operator by virtue of the frictional interengagement between cam 34 and walls 28. To terminate operation of the camera, the operator must move knob 30 to its "run" position.

Figure 3:
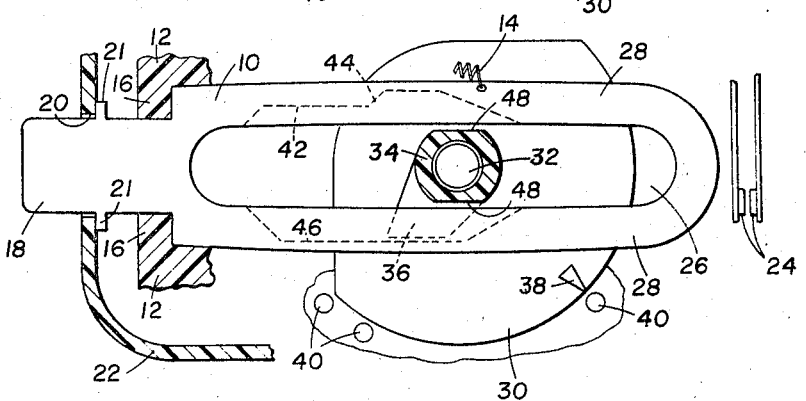
FIG. 3 is a view similar to FIGS. 1 and 2 showing the trigger mechanism in its "run" condition.
Figure 4:
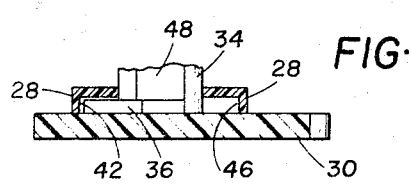
FIG. 4 is a section view taken along line 4—4 of FIG. 1.

When knob 30 is moved into the "run" position as seen in FIG. 3, arm 36 is moved into an elongated recess 46 in the opposite wall 28 of trigger 10, and cam 34 is moved into a position where its flattened portions 48 thereof are disengaged from the inner surfaces of walls 28 of trigger 10. Accordingly, trigger 10 is free of the control mechanism, and may be manually moved by the operator between its normal inoperative position and its depressed operative position at will.

The invention has been described in detail with particular reference to the preferred embodiment thereof, but it will be understood that variations and modifications can be effected within the spirit and scope of the invention.

I claim:
1. In a trigger mechanism for a motion picture camera, the combination comprising:
    a manually movable member adapted when moved from a normal inoperative position to an operative position to operate the camera, said member having a slot and shoulder; and
    control means for said member and movable between a first position, in which it cooperates with said member to prevent movement thereof, a second position, in which it cooperates with said member for releasably holding said member in its operative position when moved thereto, and a third position, in which it is free of said member, said control means having a cam frictionally cooperating with said slot in said first and second positions, said control means further having an arm engageable with said shoulder in said first position.

2. In a trigger mechanism for a motion picture camera, the combination comprising:

a manually movable member adapted when moved from a normal inoperative position to an operative position to operate the camera, said member being reciprocatively movable and having a slot therethrough forming a pair of spaced walls, one of said walls having a recess and a shoulder in said recess; and control means for said member and movable between a first position, in which it cooperates with said member to prevent movement thereof, a second position, in which it cooperates with said member for releasably holding said member in its operative position when moved thereto, and a third position, in which it is free of said member, said control means having a cam extending into said slot and frictionally cooperating therewith in said first and second positions, said control means further having an arm engageable with said shoulder in said first position.

3. The invention according to claim 2 wherein said cam is rotatably mounted, said arm is secured to said cam, and said control means has a knob secured to said cam and arm for rotatably moving said cam and arm.

References Cited

UNITED STATES PATENTS

| | | | |
|---|---|---|---|
| 2,493,443 | 1/1950 | Cisski | 352—178 |
| 3,048,082 | 8/1962 | Ferrari | 352—178 |
| 3,376,094 | 4/1968 | Baginski | 352—178 X |

NORTON ANSHER, Primary Examiner

M. H. HAYES, Assistant Examiner